United States Patent [19]

Rosenberger et al.

[11] 3,887,518

[45] June 3, 1975

[54] SALICYLOYL-ACYL-HYDRAZINES

[75] Inventors: Siegfried Rosenberger, Riehen; Kurt Schwarzenbach, Aesch, both of Switzerland

[73] Assignee: Ciba-Geigy Corporation, Ardsley, N.Y.

[22] Filed: Jan. 9, 1974

[21] Appl. No.: 431,996

Related U.S. Application Data

[62] Division of Ser. No. 256,969, May 25, 1972, abandoned.

[30] Foreign Application Priority Data

June 29, 1971  Switzerland..................... 9529/71

[52] U.S. Cl. ............. 260/45.9 NC; 260/45.7 PH; 260/45.75 N; 260/45.8 N; 260/45.85 R; 260/45.85 T; 260/45.9 R; 260/45.95 C; 260/45.95 H

[51] Int. Cl. .............................................. C08f 45/60
[58] Field of Search ............................ 260/45.9 NC

[56] References Cited
UNITED STATES PATENTS

| | | | |
|---|---|---|---|
| 3,660,438 | 5/1972 | Dexter | 260/45.9 NC |
| 3,772,245 | 11/1973 | Dexter | 260/45.9 NC |
| 3,773,722 | 11/1973 | Dexter | 260/45.9 NC |
| 3,773,830 | 11/1973 | Dexter | 260/45.9 NC |

*Primary Examiner*—Melvyn I. Marquis

[57] ABSTRACT

New salicyloyl-acyl-hydrazines are stabilizers for polyolefines. They are prepared by reacting a salicycloyl-hydrazine with a monocarboxylic acid chloride or a monocarboxylic acid hydrazine with a salicycloylic acid chloride.

13 Claims, No Drawings

SALICYLOYL-ACYL-HYDRAZINES

This is a division of application Ser. No. 256,969, filed on May 25, 1972, now abandoned.

The subject of the present invention are new salicyloyl-acyl-hydrazines and their use for stabilising polyolefines.

Because of their physical and electrical properties polyolefines, especially polypropylene, are very suitable for use as an insulating material in the electrical industry, especially for coating copper wires and cables and other electrically conducting materials made of copper. Unfortunately, however, the said good properties of the polyolefines are worsened through the fact that in contact with transition metals, especially with copper and its compounds, the polyolefines undergo an oxidative degradation catalysed by these metals. Additions of copper of less than 1%, for example, already result in the stability of polypropylene to oxidation being reduced by a factor of 100.

Various derivatives of salicycloylhydrazine have already been disclosed for stabilising polyolefines against the harmful action of transition metals. Thus, U.S. Pat. No. 3,110,696 recommends employing N-salicyloyl-N'-salicylidene-hydrazines for this purpose. These compounds admittedly show an effect as metal deactivators but suffer from the disadvantage that they cause an objectionable yellowish discolouration of the polymer. British Pat. Specification No. 1,093,383 describes salicylic acid hydrazide and its alkylated, cycloalkylated and arylated derivatives which admittedly are inherently colourless substances but of which the metal-deactivating effect in no way approaches the abovementioned salicylidene derivatives of salicylic acid hydrazide. The same is true of the acylation products of salicylic acid hydrazide described in Japanese Pat. Publication No. 43-18,607. The two compounds last mentioned furthermore suffer from the disadvantage of objectionably discolouring the polyolefine either already on incorporation or under thermo-oxidative aging conditions.

It has now been found, surprisingly, that the compounds of the formula I

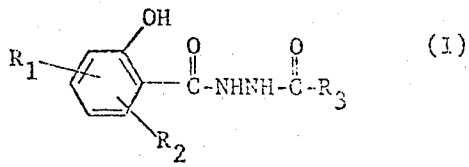

in which $R_1$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_2$ denotes hydrogen, alkyl with 1 to 5 carbon atoms, alkenyl with 3 or 4 carbon atoms, cyclohexyl, aralkyl with 7 to 9 carbon atoms, chlorine or hydroxyl, $R_3$ denotes alkyl with 2 to 21 carbon atoms, cyclohexyl or the radical

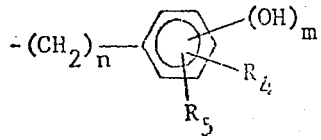

$m$ denotes 0 or 1 and $n$ denotes 0 to 2, the difference $n-m$ being not less than 0 if the OH group is in the o-position to the $-(CH_2)_n$ group, and wherein $R_4$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms and $R_5$, if $m$ is 1, denotes hydrogen, alkyl with 1 to 5 carbon atoms, alkenyl with 3 or 4 carbon atoms, cyclohexyl, aralkyl with 7 to 9 carbon atoms, chlorine or hydroxyl, or $R_5$, if $m$ is 0, denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms are very suitable for stabilising homopolymeric or copolymeric polyolefines against thermo-oxidative degradation and that these compounds simultaneously possess good colour properties.

Preferred compounds of the formula I are those in which $R_1$ denotes hydrogen, hydroxyl, chlorine, alkyl with 1 to 8 carbon atoms, alkoxy with 1 to 18 carbon atoms or acetoxy, $R_2$ denotes hydrogen, butyl or chlorine and $R_3$ denotes alkyl with 3 to 17 carbon atoms, cyclohexyl or the radical

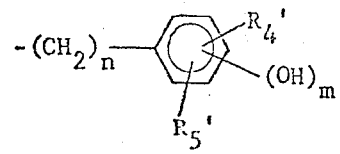

wherein $m$ is 0 or 1, $n$ is 0 to 2 and the difference $n-m$ is not less than 0 if the OH group is in the o-position to the $-(CH_2)_n$-group, $R_4'$ is hydrogen, hydroxyl, chlorine, alkyl with 1 to 4 carbon atoms or alkoxy with 1 to 16 carbon atoms and $R_5'$ is hydrogen, chlorine, alkyl with 1 to 4 carbon atoms, hexadecyloxy, acetylamino or o-hydroxybenzoylamino.

The compounds of the formula I in particular protect homopolymeric and copolymeric polyolefines against thermooxidative degradation in the presence of transition metals.

The compounds of the formula I are not only excellent stabilisers but furthermore have the advantage of being colourless. This allows them to be incorporated into polyolefines without objectionably discolouring the latter. All the abovementioned previously known compounds possess the property of causing discolouration in polyolefines under aging conditions, whilst the compounds according to the invention cause practically no discolouration under these conditions, which represents a great technical advantage for long-term stabilisation.

If $R_1$, $R_2$, $R_3$, $R_4$ and/or $R_5$ represent alkyl groups, these can, within the indicated limits, be methyl, ethyl, propyl, isopropyl, butyl, sec.-butyl, tert.-butyl, amyl, tert.-amyl, sec.-amyl, hexyl, iso-heptyl, octyl, tert.-octyl, nonyl, dodecyl, tetradecyl, hexadecyl, octadecyl or eicosyl. If $R_1$, $R_2$, $R_4$ and/or $R_5$ are alkenyl groups, these can be allyl or butenyl.

$R_1$, $R_4$ and/or $R_5$ can be cycloalkyl groups with 6 to 8 carbon atoms such as, for example, cyclohexyl, α-methylcyclohexyl or cyclooctyl. If $R_1$, $R_2$, $R_4$ and/or $R_5$ are aralkyl groups, they can be benzyl or α-phenylethyl.

If $R_1$, $R_4$ and/or $R_5$ is an alkoxy group with 1 to 18 carbon atoms this can be, for example, methoxy, ethoxy, propoxy, butoxy, hexoxy, octoxy, decyloxy, dodecyloxy, tetradecyloxy, or octadecyloxy. $R_1$, $R_4$ and/or $R_5$ can also be an acyloxy group with 2 to 18 carbon atoms or an acylamino group with 2 to 18 carbon atoms, "acyl" being, for example, an acyl radical of the following acids: acetic acid, propionic acid, butyric acid, isobutyric acid, valeric acid, caproic acid, 2-ethylcaproic acid, caprylic acid, capric acid, lauric acid, myristic acid, palmitic acid, stearic acid, acrylic acid, methacrylic acid, crotonic acid, oelic acid, benzoic acid, phenylacetic acid and salicylic acid.

Compounds of the formula I which are particularly preferred as metal deactivators are those in which $R_1$ denotes hydrogen, alkyl with 1–8 carbon atoms, chlorine or alkoxy with 1–8 carbon atoms, $R_2$ denotes hydrogen, alkyl with 1–5 carbon atoms or chlorine, and $R_3$ denotes alkyl with 3 to 17 carbon atoms, cyclohexyl, benzyl or one of the radicals

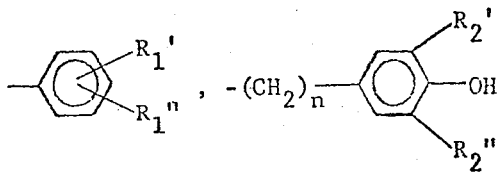

wherein $n$ denotes 0 to 2, $R_1'$ and $R_1''$ independently of one another denote hydrogen, alkyl with 1 to 8 carbon atoms, chlorine or alkoxy with 1 to 8 carbon atoms and $R_2'$ and $R_2''$ independently of one another denote hydrogen, alkyl with 1 to 5 carbon atoms or chlorine.

Compounds of the formula I which are particularly preferred as antioxidants are those in which $R_1$ denotes hydrogen, alkyl with 1–5 carbon atoms or alkoxy with 1–18 carbon atoms, $R_2$ denotes hydrogen or alkyl with 1–5 carbon atoms and $R_3$ denotes alkyl with 3 to 17 carbon atoms or one of the radicals

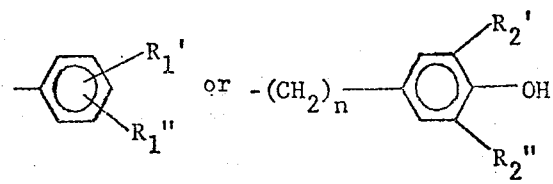

wherein $n$ denotes 0 to 2, $R_1'$ and $R_1''$ independently of one another denote hydrogen, alkyl with 1 to 5 carbon atoms or alkoxy with 1 to 18 carbon atoms and $R_2'$ and $R_2''$ independently of one another denote hydrogen or alkyl with 1 to 5 carbon atoms.

Particularly good stabilising properties as metal deactivators are shown, for example, by the following compounds of the formula I: N-salicyloyl-N′-stearoyl-hydrazine, N-(5-tert.butyl-salicyloyl)-N′-stearoyl-hydrazine, N-salicyloyl-N′-(4-methoxybenzoyl)-hydrazine, N-salicyloyl-N′-(4-tert.butylbenzoyl)-hydrazine, N-salicyloyl-N′-(4-acetylaminobenzoyl)-hydrazine, N-salicyloyl-N′-phenylacetyl-hydrazine, N-(4-chlorosalicyloyl)-N′-lauroyl-hydrazine, N-salicyloyl-N′-(4-salicyloylaminobenzoyl)-hydrazine and N-salicyloyl-N′-(3,4-ditert. butyl-4-hydroxybenzoyl)-hydrazine.

Particularly good stabilising properties when used as antioxidants are shown, for example, by the following compounds of the formula I: N-salicyloyl-N′-2-ethylhexyl-hydrazine, N-salicyloyl-N′-lauroyl-hydrazine, N-salicyloyl-N′-(3,5-dihexadecyloxybenzoyl)-hydrazine, N-salicyloyl-N′-(3,4-dimethylbenzoyl)-hydrazine, N-(4-octoxysalicyloyl)-N′-stearoyl-hydrazine, N-(4-methoxysalicyloyl)-N′-(4′-methoxybenzoyl)-hydrazine and N-salicyloyl-N′-β(3,5-ditert.butyl-4-hydroxyphenyl)-propionylhydrazine.

The compounds of the formula I protect against degradation: polyolefines, preferably α-olefine polymers, such as polypropylene, optionally crosslinked polyethylene, polyisobutylene, polymethylbutene-1, polymethylpentene-1, polybutene-1, polyisoprene and polybutadiene; copolymers of the monomers on which the said homopolymers are based, such as ethylene-propylene copolymers, propylene-butene-1 copolymers, propylene-isobutylene copolymers, styrene-butadiene copolymers, and terpolymers of ethylene and propylene with a diene such as, for example, hexadiene, dicyclopentadiene or ethylidenenorbornene; mixtures of the abovementioned homopolymers such as, for example, mixtures of polypropylene and polyethylene, polypropylene and poly-butene-1, and polypropylene and polyisobutylene. Polypropylene and its mixtures, and the copolymers which contain propylene units, are at the same time preferred.

The compounds of the formula I are incorporated into the substrates in a concentration of 0.01 to 5% by weight calculated relative to the material to be stabilised.

Preferably, 0.05 to 1.5, and especially preferably 0.1 to 0.8% by weight of the compounds, calculated relative to the material to be stabilised, are incorporated into the material. The incorporation can be effected after polymerisation, for example by mixing at least one of the compounds of the formula I, and optionally further additives, into the melt in accordance with the methods customary in the art, before or after shaping, or by application of the dissolved or dispersed compounds to the polymer, if necessary with subsequent evaporation of the solvent.

In the case of crosslinked polyethylene, the compounds are added before crosslinking.

As further additives together with which the stabilisers usable according to the invention can be employed, there should be mentioned:

1. Antioxidants of the aminoaryl and hydroxyaryl series. Amongst the latter, there should be mentioned the sterically hindered phenol compounds, for example: 2,2′-thiobis-(4-methyl-6-tert.butylphenol), 4,4′-thiobis-(3-methyl-6-tert.-butylphenol), 2,2′-methylene-bis-(4-methyl-6-tert.butylphenol), 2,2′-methylene-bis-(4-ethyl-6-tert.butylphenol), 4,4′-methylene-bis(2-methyl-6-tert.butylphenol), 4,4′-butylidene-bis-(3-methyl-6-tert.butylphenol), 2,2′-methylene-bis-[4-methyl-6-(α-methylcyclohexyl)-phenol], 2,6-di-(2-hydroxy-3-tert.butyl-5-methylbenzyl)-4-methyl-phenol, 2,6-di-tert.-butyl-4-methylphenol, 1,1,3-tris-2-methyl-(4-hydroxy-5-tert.butyl-phenyl)-butane, and 1,3,5-trimethyl-2,4,6-tri- (3,5-di-tert.butyl-4-hydroxy-benzyl)-benzene, esters of β-4-hydroxy-3,5-di-tert.butylphenol-propionic acid with monohydric or polyhydric alcohols, such as methanol, ethanol, octadecanol, hexanediol, nonanediol, thiodiethylene glycol, trimethylolethane or pentaerythritol, 2,4-bis-octylmercapto-6-(4-hydroxy-3,5-di-tert.-butylanilino)-s-triazine, 2,4-bis-(4-hydroxy-3,5-di-tert.butylphenoxy)-6-octylmercapto-s-triazine, 1,1-bis-(4-hydroxy-2-methyl-5-tert.butyl-phenyl)-3-dodecyl-mercapto-butane, 4-hydroxy-3,5-di-tert.butylbenzyl-phosphonic acid esters, such as the dimethyl, diethyl or dioctadecyl ester, (3-methyl-4-hydroxy-5-tert.-butyl-benzyl)-malonic acid dioctadecyl ester, s-( 3,5-dimethyl-4-hydroxyphenyl)-thioglycolic acid octadecyl ester, esters of bis-(3,5-di-tert.butyl-4-hydroxybenzyl)-malonic acid, such as the didodecyl ester, the dioctadecyl ester and the 2-dodecylmercaptoethyl ester, and tri-s-(3,5-di-tert.butyl-4-hydroxybenzyl)-isocyanurate.

Amongst the aminoaryl derivatives, there should be mentioned aniline and naphthylamine derivatives as well as their heterocyclic derivatives, for example phenyl-1-naphthylamine, phenyl-2-naphthylamine, N,N'-diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-dihydroquinoline, mono- and dioctyliminodibenzyl, and polymerised 2,2,4-trimethyl-1,2-dihydroquinoline, though admittedly, in the case of the combined use of the compounds of the formula I with the abovementioned amine compounds, the stabilised polymer no longer possesses such good colour properties, because of the tendency of the amine compounds to discolour.

2. UV-absorbers and light protection agents such as:

a. 2-(2'-hydroxyphenyl)-benztriazoles, for example the 5'-methyl, 3',5'-di-tert.butyl, 5'-tert.butyl, 5-chloro-3',5'-ditert.butyl, 5-chloro-3'-tert.butyl-5'-methyl, 3', 5'-di-tert. amyl, 3'-methyl-5'-β-carbomethoxyethyl, and 5-chloro-3', 5'-di-tert.amyl derivative.

b. 2,4-Bis-(2'-hydroxyphenyl)-6-alkyl-s-triazines, for example the 6-ethyl or 6-undecyl derivative.

c. 2-hydroxy-benzophenones, for example the 4-hydroxy, 4-methoxy, 4-octoxy, 4-decyloxy, 4-dodecyloxy, 4,2',4'-trihydroxy or 2'-hydroxy-4,4'-dimethoxy derivative, d. 1,3-bis-(2'-hydroxy-benzoyl)-benzenes, for example, 1,3-bis-(2'-hydroxy-4'-hexyloxy-benzoyl)-benzene, 1-3-bis-(2'-hydroxy-4'-octoxy-benzoyl)-benzene and 1,3-bis-(2'-hydroxy-4'-dodecyloxyben-zoyl)-benzene.

e. Aryl esters of optionally substituted benzoic acids, such as, for example, phenyl salicylate, octylphenyl salicylate, benzoylresorcinol, dibenzoylresorcinol, 3,5-di-tert.butyl-4-hydroxybenzoic acid 2,4-di-tert.butyl-phenyl ester or octadecyl ester.

f. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester of butyl ester, and N-(β-carbomethoxyvinyl)-2-methylindoline.

g. Nickel compounds, for example nickel complexes of 2,2'-thiobis-(4-tert.octylphenol), such as the 1:1 and 1:2 complex, optionally with other ligands such as n-butylamine, nickel complexes of bis-(4-tert.-octylphenyl)-sulphone such as the 2:1 complex, optionally with other ligands such as 2-ethylcaproic acid, nickel dibutyldithiocarbamate, the nickel salt of 4-hydroxy-3,5-di-tert.butylbenzyl-phosphonic acid monoalkyl esters, such as of the methyl, ethyl or butyl esters, and the nickel complex of 2-hydroxy-4-methyl-phenyl-undecylketonoxime.

h. Oxalic acid diamides, for example 4,4'-di-octyloxyoxanilide, 2,2'-di-octyloxy-5,5'-di-tert.butyl-oxanilide and 2,2'-didodecyloxy-5,5'-di-tert.butyl-oxanilide.

3. Phosphites, such as triphenylphosphite, diphenylalkylphosphites, phenyldialkylphosphites, trinonylphenylphosphite, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

4. Nucleating agents, such as 4-tert.butylbenzoic acid, adipic acid and diphenylacetic acid.

5. Compounds which destroy peroxides, such as esters of β-thiodipropionic acid, for example the lauryl, stearyl, myristyl or tridecyl ester. Salts of 2-mercaptobenzimidazole, for example the zinc salt, and diphenylthiourea.

6. Basic co-stabilisers such as alkali salts and alkaline earth salts of higher saturated or unsaturated fatty acids, such as, for example, calcium stearate.

7. Other additives such as plasticisers, antistatic agents, dyeing auxiliaries, flameproofing agents, pigments, carbon black, asbestos, glass fibres, kaolin, talc and blowing agents.

When using the stabilisers according to the invention in combination with phenolic antioxidants, particularly good stabilising effects are achieved if at the same time peroxide-destroying compounds such as higher alkyl esters of thiopropionic acid are employed, since these peroxide-destroying compounds not only show a synergism, as is known, with the phenolic antioxidants, but additionally with the stabilisers of the formula I.

The compounds which can be used according to the invention can above all be manufactured by two reaction routes which are in themselves known:

a. Reaction of one mol of a salicylic acid hydrazide which is optionally substituted in the benzene nucleus with 1 mol of a reactive derivative of a monocarboxylic acid, for example of a monocarboxylic acid chloride or b. acylation of a monocarboxylic acid hydrazide with a salicylic acid chloride which is optionally substituted in the benzene nucleus.

The polyolefines stabilised by adding the compounds according to the invention are in particular suitable for use as coatings material for copper wires and copper cables, but also for other types of metal coating, and for the manufacture of shaped articles such as films, filaments, sheets, pipes, injection-moulded articles and the like. They can also be used mixed with copper or pigments containing copper.

The invention is described in more detail in the examples which follow.

EXAMPLE 1

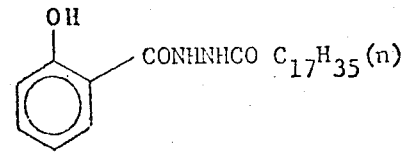

15.2 g of N-salicyloylhydrazine are dissolved in 200 ml of dimethylacetamide and 30.3 g of stearcyl chloride and a solution of 8.0 g of pyridine in 50 ml of dimethylacetamide are simultaneously added over the course of 15 minutes at 20°–40°C, whilst stirring. The homogeneous reaction mixture is stirred for a further hour at 50°C and is subsequently poured into approx. one litre of water. The pulverulent, almost white precipitate is isolated, washed with water, dried at 80°C and recrystallised from ethylene glycol monomethyl ether. The N-salicyloyl-N'-stearoylhydrazine thus obtained (stabiliser No. 1) has a melting point of 141°C.

If in this example the stearoyl chloride is replaced by the equimolecular amount of one of the acid chlorides of the following Table 1, and the analogous procedure is followed, the corresponding N-salicyloyl-N'-acylhydrazines are obtained, having the melting points indicated:

Table 1

| Acid chloride | Melting point of the N-salicyloyl-N'-acylhydrazine |
|---|---|
| n-$C_3H_7$COCl | 182°C (Stabiliser No. 2) |
| n-$C_4H_7$CH($C_2H_5$)-COCl | 112°C (Stabiliser No. 3) |
| n-$C_{11}H_{23}$COCl | 158°C (Stabiliser No. 4) |
| $C_6H_5$-COCl (H-Ph-COCl) | 236°C (Stabiliser No. 5) |
| $CH_3O$-$C_6H_4$-COCl | 218°C (Stabiliser No. 6) |
| n-$C_{16}H_{33}$O-$C_6H_4$-COCl | 164°C (Stabiliser No. 7) |
| 3,5-bis(n-$C_{16}H_{33}$O)-$C_6H_3$-COCl | 88°C (Stabiliser No. 8) |
| $C_6H_5$-COCl | 259°C (Stabiliser No. 9) |
| $(CH_3)_3C$-$C_6H_4$-COCl | 248°C (Stabiliser No. 10) |
| 3,5-$(CH_3)_2$-$C_6H_3$-COCl | 272°C (Stabiliser No. 11) |

Table 1—Continued

| Acid chloride | Melting point of the N-salicyl-oyl-N'-acylhydrazine |
|---|---|
| Cl–C₆H₃(Cl)–COCl (2,4-dichloro) | 246°C (Stabiliser No. 12) |
| CH₃CONH–C₆H₄–COCl | 274°C (Stabiliser No. 13) |
| C₆H₅–CH₂COCl | 234°C (Stabiliser No. 14) |
| 2-HO-C₆H₄–CH₂–COCl | 218°C (Stabiliser No. 15) |
| 3,4-(HO)₂-C₆H₃–COCl | 299°C (Stabiliser No. 16) |
| HO–C₆H₄–COCl | 264°C (Stabiliser No. 17) |

EXAMPLE 2

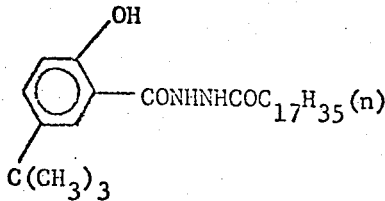

20.8 g of N-(5-t-butyl-salicyloyl)-hydrazine, suspended in 160 ml of dimethylacetamide, are initially introduced into the reaction vessel and 30.3 g of stearoyl chloride as well as a solution of 8.0 g of pyridine in 50 ml of dimethylacetamide are simultaneously added over the course of 15 minutes at 20°–40°C whilst stirring. The homogeneous reaction mixture is stirred for a further hour at 40°C and is subsequently poured into approx. one litre of water. The pulverulent, almost white precipitate is isolated, washed with water, dried at 60°C and recrystallised from ethanol.

The N-(5-t-butyl-salicyloyl)-N'-stearoylhydrazine thus obtained (stabiliser No. 18) has a melting point of 117°C.

If, in this example, the N-(5-t-butyl-salicyloyl)-hydrazine is replaced by the equimolecular amount of a substituted N-salicyloyl-hydrazine of Table 2 below and the analogous procedure is followed, the correspondingly substituted N-salicyloyl-N'-stearoylhydrazines, having the melting points indicated, are obtained:

Table 2

| Substituted N-salicyloyl-hydrazine | Melting point of the substituted N-salicyloyl-N'-stearoyl-hydrazine |
|---|---|
| 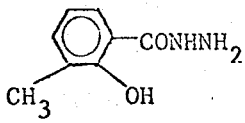 3-methyl-2-hydroxy-CONHNH₂ | 99°C (Stabiliser No. 19) |

Table 2—Continued

| Substituted N-salicyloyl-hydrazine | Melting point of the substituted N-salicyloyl-N'-stearoyl-hydrazine |
|---|---|
| tert.butyl, tert.butyl substituted salicyloyl hydrazide (-CONHNH$_2$, -OH) | 114°C (Stabiliser No. 20) |
| $H_{17}C_8O$— substituted (-CONHNH$_2$, -OH) | 155°C (Stabiliser No. 21) |
| $OC_4H_9$ substituted (-CONHNH$_2$, -OH) | 140°C (Stabiliser No. 22) |
| $OC_{18}H_{37}$ substituted (-CONHNH$_2$, -OH) | 134°C (Stabiliser No. 23) |
| OH substituted (-CONHNH$_2$, -OH) | 228°C (Stabiliser No. 24) |
| $CH_3COO$— substituted (-CONHNH$_2$, -OH) | 163°C (Stabiliser No. 25) |
| Cl, Cl substituted (-CONHNH$_2$, -OH) | (Stabiliser No. 26) |

EXAMPLE 3

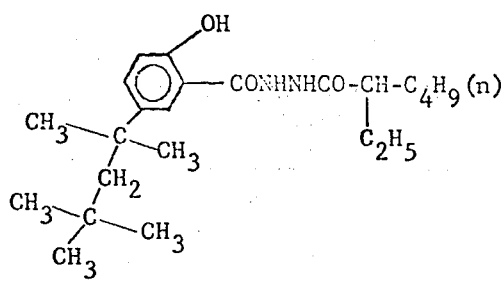

26.4 g of N-[5-(1,1,3,3-tetramethylbutyl)-salicyloyl]-hydrazine are dissolved in 200 ml of dimethylacetamide and 10.1 g of trimethylamine are added. 16.2 g of α-ethyl-caproic acid chloride in 20 ml of absolute dioxane are then added dropwise over the course of 15 minutes at 20°–40°C, whilst stirring. Thereafter the reaction mixture is additionally heated to 90°C for 4 hours. In the course thereof, the triethylamine hydrochloride formed largely separates out.

After cooling, the batch is poured into approx. 1 litre of ice water. The initially amorphous precipitate soon solidifies to crystals. They are filtered off and washed with water, and the moist filter residue is recrystallised from ethylene glycol monomethyl ether.

The N-[5-(1,1,3,3-tetramethylbutyl)-salicyloyl]-N'-α-ethylcapronoylhydrazine thus obtained (stabiliser No. 27) has a melting point of 158°C.

EXAMPLE 4

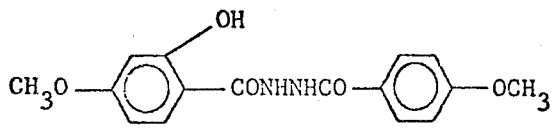

18.2 g of N-(4-methoxy-2-hydroxybenzoyl)-hydrazine are dissolved in 150 ml of dimethylacetamide and 17.0 g of 4-methoxybenzoyl chloride are added over the course of 15 minutes at 20°–40°C, whilst stirring. The reaction mixture is then further heated for 3 hours to 70°C and after cooling is poured into approx. 1 litre of water. The yellowish white powdery precipitate is filtered off, washed with water and dried at 90°C. For purification, the product is recrystallised from ethylene glycol monomethyl ether.

The N-(4-methoxy-2-hydroxybenzoyl)-N'-(4-methoxybenzoyl)-hydrazine thus obtained (stabiliser No. 28) has a melting point of 236°C.

EXAMPLE 5

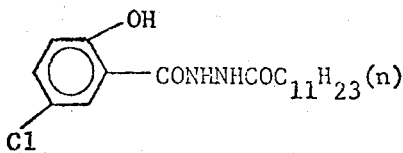

18.7 g of N-(5-chloro-salicyloyl)-hydrazine are dissolved in 150 ml of dimethylacetamide and 21.9 g of lauroyl chloride are added over the course of 15 minutes at 20°–40°C, whilst stirring. The reaction mixture is then further heated for 3 hours to 70°C and after cooling is poured into approx. 1 litre of water. The yellowish white powdery precipitate is filtered off, washed with water and dried at 90°C. The product is purified by recrystallisation from ethylene glycol monomethyl ether.

The N-(5-chloro-salicyloyl)-N'-lauroylhydrazine thus obtained (stabiliser No. 29) has a melting point of 206°C.

If in this example the N-(5-chloro-salicyloyl)-hydrazine is replaced by the equimolecular amount of a substituted N-salicyloyl-hydrazine of Table 3 below and the analogous procedure is followed, the correspondingly substituted N-salicyloyl-N'-lauroyl-hydrazines are obtained:

Table 3

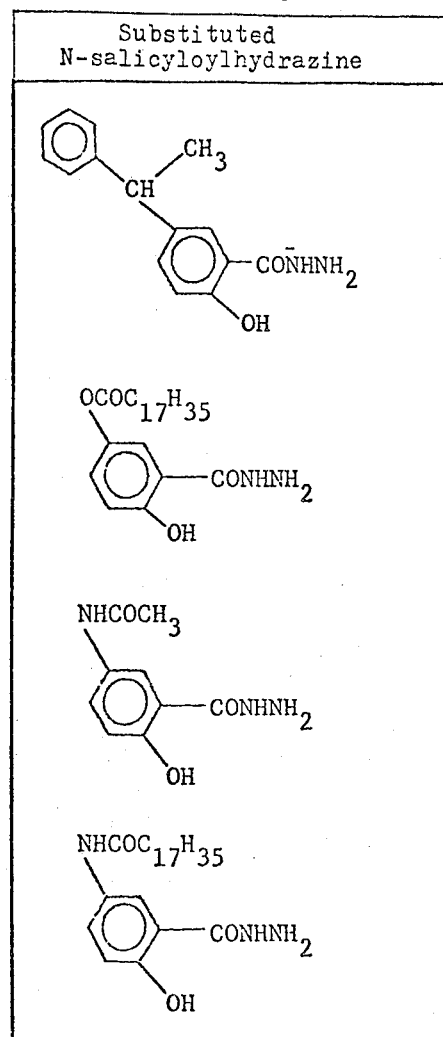

EXAMPLE 6

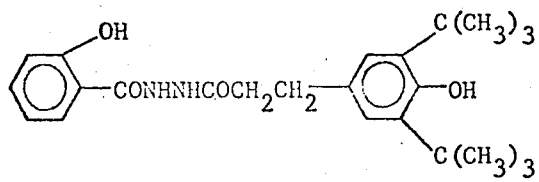

20 g of N-3-(3,5-di-tert.butyl-4-hydroxyphenyl)-propionyl-hydrazine are dissolved in 150 ml of dimethylacetamide and 11.0 g of salicylic acid chloride and a solution of 5.5 g of pyridine in 10 ml of dimethylacetamide are simultaneously added over the course of 15 minutes at room temperature whilst stirring. The reaction mixture is stirred for a further hour at 50°C and is subsequently poured into approx. 1 litre of water. The precipitate is filtered off, washed with water, dried and subsequently recrystallised from ethanol.

N-3-(3,5-di-tert.butyl-4-hydroxyphenyl)-propionyl-N'-salicyloyl-hydrazine (stabiliser No. 30) of melting point 219°C is thus obtained.

EXAMPLE 7

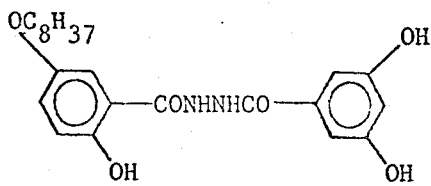

16.8 g of 3,5-dihydroxybenzhydrazide are initially introduced into 200 ml of dimethylacetamide. A solution of 42.5 g of 2-hydroxy-5-octadecyloxybenzoyl chloride in 100 ml of toluene is added dropwise over the course of 10 minutes. When the exothermic reaction has subsided, the mixture is additionally briefly heated to 80°C. It is poured into 2 litres of water and the crystalline precipitate is filtered off and dried. N-(2-hydroxy-5-octadecyloxy)-benzoyl-N'-(3,5-dihydroxybenzoyl)-hydrazine (stabiliser No. 31) is thus obtained, melting at 212°C after recrystallisation from dioxane.

EXAMPLE 8

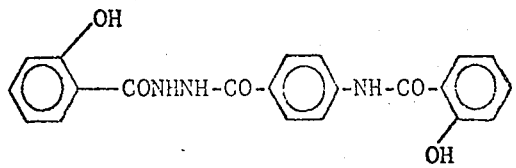

5.2 g of p-aminobenzhydrazide are dissolved in 30 ml of dimethylacetamide. After adding 7.1 g of triethylamine, 11.0 g of salicylic acid chloride dissolved in 20 ml of absolute dioxane are added dropwise whilst cooling with ice. When the strongly exothermic reaction has subsided, the mixture is further warmed for 1 hour to 80°C and then cooled and poured into approx. 1 litre of water. The precipitate, which is initially oily, becomes crystalline after some hours. It is filtered off, dried and recrystallised from ethylene glycol monomethyl ether. N-salicyloyl-N'-(4-salicyloylaminobenzoyl)-hydrazine (stabiliser No. 32) of melting point 275°C is thus obtained.

The previously known metal deactivators for polyolefines, listed in Table 4 below, were conjointly tested as comparison compounds in the test examples which follow:

Table 4

| Stabiliser No. | Chemical description |
|---|---|
| 33 | Oxanilide |
| 34 | Oxalic acid dihydrazide |
| 35 | Carbohydrazide |
| 36 | Malonic acid dihydrazide |
| 37 | Adipic acid dihydrazide |
| 38 | Terephthalic acid dihydrazide |
| 39 | Isophthalic acid dihydrazide |
| 40 | Succinic acid bis-phenylhydrazide |
| 41 | Sebacic acid bis-phenylhydrazide |
| 42 | Salicylic acid hydrazide |
| 43 | N-Acetyl-N'-salicyloyl-hydrazine |
| 44 | N-Salicyloyl-N'-salicylal-hydrazine |

EXAMPLE 9 a. Manufacture of the test specimens 100 parts of polypropylene (melt index 3.2 g/10 minutes, 230°C/2160 g) are thoroughly mixed in a shaking apparatus with 0.1 part of 3-(3,5-di-t.butyl-4-hydroxyphenyl)-propionic acid octadecyl ester, 0.3 part of dilauryl thiodipropionate and 0.5 part of one of the additives listed in Table 5 below, for 10 minutes.

The resulting mixture is kneaded for 10 minutes in a Brabender plastograph at 200°C, 1.0% by weight of powdered copper (manufactured electrolytically, Merck) is then added and the whole is thoroughly mixed at the same temperature for a further 2 minutes. The composition thus obtained is subsequently pressed in a sheet press at 260°C platen temperature to give 1 mm thick sheets from which strips 1 cm wide and 17 cm long are punched.

The heat-stabilised test specimens without added copper, or with added copper but without metal deactivator, required for comparison purposes, are manufactured analogously.

b. Test

The test for the effectiveness of the metal deactivators added to the test strips containing copper is carried out by heat aging in a circulating air oven at 149°C, and comparison is made with test strips not containing copper. For this purpose, 3 test strips were used of each formulation. The incipient easily visible decomposition of the test strip is defined as the end point.

Table 5

| Stabiliser No. | Days up to decomposition | |
|---|---|---|
| | without copper | with copper |
| Without additive | 18 – 27 | 1 |
| 1 | 23 | 19 |
| 2 | 44 | 14 |
| 3 | 45 | 14 |
| 4 | 42 | 14 |
| 6 | 23 | 14 |
| 11 | 45 | 13 |
| 13 | 18 | 18 |
| 17 | 35 | 18 |
| 18 | 34 | 19 |
| 28 | 48 | 20 |
| 29 | 23 | 14 |
| 31 | 50 | 13 |
| 32 | 25 | 20 |
| Comparison products | | |
| 33 | 18 | 1 |
| 34 | 24 | 6 |
| 37 | 18 | 2 |
| 38 | 25 | 2 |
| 40 | 21 | 1 |
| 41 | 25 | 14 |
| 42 | 27 | 8 |
| 43 | 20 | 4 |
| 44 | 19 | 16 |

EXAMPLE 10 a. Manufacture of the test specimens 100 parts of polypropylene (melt index 3.2 g/10 minutes, 230°C/2160 g) are thoroughly mixed in a shaking apparatus with 0.1 part of 3-(3,5-di-t.butyl-4-hydroxyphenyl)-propionic acid octadecyl ester, 0.3 part of dilauryl thiodipropionate and 0.5 part of one of the additives listed in Table 7 below, for 10 minutes.

The resulting mixture is kneaded for 10 minutes in a Brabender plastograph at 200°C, 1.0% by weight of powered copper (manufactured electrolytically, Merck) is then added and the whole is thoroughly mixed at the same temperature for a further 2 minutes. The composition thus obtained is subsequently pressed in a sheet press at 260°C platen temperature to give 1 mm thick sheets, from which strips 1 cm wide and 17 cm long are punched by means of a punch tool.

The heat-stabilised test specimens without added copper, or with added copper but without metal deactivator, required for comparison purposes, are manufactured analogously.

b. Test

The test for the effectiveness of the metal deactivators added to the test strips containing copper is carried out by heat aging in a circulating air oven at 135°C, and comparison is made with test strips not containing copper. For this purpose, 3 test strips are used of each formulation. The incipient easily visible decomposition of the test strip is defined as the end point.

Table 6

| Stabiliser No. | Days up to decomposition | |
|---|---|---|
| | without copper | with copper |
| Without additive | 70 – 95 | 1 |
| 1 | 114 | 86 |
| 2 | 93 | 48 |
| 3 | 99 | 51 |
| 4 | 85 | 51 |
| 6 | 99 | 51 |
| 7 | 145 | 46 |
| 9 | 118 | 54 |
| 10 | 90 | 41 |
| 11 | 99 | 48 |
| 13 | 90 | 90 |
| 14 | 99 | 48 |
| 18 | 111 | 75 |
| 21 | 146 | 62 |
| 28 | 99 | 90 |
| 32 | 105 | 76 |
| Comparison products | | |
| 35 | 76 | 13 |
| 36 | 72 | 1 |
| 38 | 88 | 4 |
| 42 | 90 | 24 |
| 43 | 90 | 27 |
| 44 | 86 | 72 |

EXAMPLE 11

The test specimens without added copper, described in Example 9, were additionally tested for their colour stability, namely:

a. After incorporation (Table 7, column 2)
b. After heat aging at 149°C (Table 7, column 3)
c. After 1-week's treatment with boiling water (Table 7, column 4)

For Table 7, an empirical colour scale was used, in which 5 denotes colourless
4 denotes a just perceptible slight discolouration and
3, 2, 1, < 1 denote progressively stronger discolouration.

Table 7

| Stabiliser No. | Test for colour stability (without added copper) Colour assessment according to Scale 1–5 | | |
|---|---|---|---|
| | After incorporation | After heat aging at 149°C | Boiling water, 1 week |
| Without additive | 5 | 4 | 4 |
| 2 | 4 | 2 | 3 |
| 3 | 4–5 | 2 | 4 |
| 4 | 4 | 2 | 4 |
| 5 | 4–5 | 2 | 3 |
| 7 | 4–5 | 2 | 3 |

Table 7-Continued

| Stabiliser No. | Test for colour stability (without added copper) Colour assessment according to Scale 1–5 | | |
|---|---|---|---|
| | After incorporation | After heat aging at 149°C | Boiling water, 1 week |
| 8 | 4 | 2 | 3 |
| 11 | 4–5 | 2 | 4–5 |
| 12 | 4 | 2 | 4 |
| 18 | 4 | 2 | 4 |
| 27 | 4–5 | 2 | 4 |
| 29 | 4 | 2 | 4 |
| Comparison products | | | |
| 33 | 4–5 | 2–3 | 4–5 |
| 34 | 1 | <1 | 2 |
| 35 | 1 | <1 | <1 |
| 36 | <1 | <1 | <1 |
| 37 | <1 | <1 | <1 |
| 38 | 3–4 | <1 | 2 |
| 40 | 3–4 | <1 | 2–3 |
| 41 | <1 | <1 | <1 |
| 42 | 1 | 1 | <1 |
| 43 | 1 | 2 | <1 |
| 44 | 1 | <1 | 2 |

EXAMPLE 12

100 parts of polypropylene (melt index 3.2 g/10 minutes, 230°C/2160 g) are thoroughly mixed for 10 minutes in a shaking apparatus with the additives listed in Table 8, in the indicated concentrations.

The resulting mixture is kneaded for 10 minutes in a Brabender plastograph at 200°C, 1.0% by weight of powdered copper (manufactured electrolytically, Merck) is then added and the whole is thoroughly mixed at the same temperature for a further 2 minutes. The composition thus obtained is subsequently pressed in a sheet press at 260°C platen temperature to give 1 mm thick sheets, from which strips 1 cm wide and 17 cm long are punched by means of a punch tool.

The fully stabilised test specimens without added copper, required for comparison purposes, are manufactured analogously.

The dependence of the action of the stabilisers on the further additives is tested by heat aging in a circulating air oven at 149°C. For results, see Table 8, column 4. The oven aging times of the test specimens without added copper, required for comparison, are indicated in Table 8, column 3.

Table 8

| Mixture | Additives and concentration | Oven aging times in days up to incipient decomposition | |
|---|---|---|---|
| | | without copper | with copper |
| 1 | 0.5 part of stabiliser 1<br>0.2 part of additive A | 15 | 9 |
| 2 | 0.5 part of stabiliser 13<br>0.2 part of additive B | 15 | 14 |
| 3 | 0.5 part of stabiliser 29<br>0.1 part of additive C | 24 | 13 |
| 4 | 0.3 part of stabiliser 1<br>0.3 part of additive D | 16 | 10 |
| 5 | 0.4 part of stabiliser 13<br>0.1 part of additive E<br>0.5 part of stabiliser 29 | 15 | 10 |
| 6 | 0.05 part of additive E<br>0.15 part of additive D<br>0.4 part of stabiliser 1 | 24 | 13 |
| 7 | 0.1 part of additive B<br>0.3 part of additive D<br>0.5 part of stabiliser 13 | 30 | 25 |
| 8 | 0.1 part of additive C<br>0.3 part of additive D | 35 | 22 |

Table 8-Continued

| Mixture | Additives and concentration | Oven aging times in days up to incipient decomposition | |
|---|---|---|---|
| | | without copper | with copper |
| 9 | 0.5 part of stabiliser 1<br>0.1 part of additive A<br>0.3 part of additive E | 16 | 11 |

Additives used:

A: 3-(3,5-di-tert.-butyl-4-hydroxyphenyl)-propionic acid n-octadecyl ester
B: 1,1,3-tris-(3'-tert.-butyl-4'-hydroxy-5'-methylphenyl)-butane
C: 1,3,5-trimethyl-2,4,6-tris-(3',5'-di-tert.-butyl-4'-hydroxybenzyl)-benzene
D: dilauryl thiodipropionate
E: 3-(3,5-di-tert.-butyl-4-hydroxyphenyl-propionic acid tetraester of pentaerythritol
F: tris-(nonylphenyl)-phosphite

EXAMPLE 13

100 parts of polypropylene (melt index 3.2 g/10 minutes, 230°C/2160 g) are thoroughly mixed for 10 minutes in a shaking apparatus with the additives listed in Table 9, in the indicated concentrations.

The resulting mixture is kneaded for 10 minutes in a Brabender plastograph at 200°C, 0.1% by weight of copper stearate is then added and the whole is thoroughly mixed for a further 2 minutes at the same temperature. The composition thus obtained is subsequently pressed in a sheet press at 260°C platen temperature to give 1 mm thick sheets, from which strips 1 cm wide and 17 cm long are punched by means of a punch tool.

The fully stabilised test specimens without added copper stearate, required for comparison purposes, are manufactured analogously.

The effectiveness of the metal deactivator (stabiliser No. 1) in the test strips containing copper stearate is tested by heat aging in a circulating air oven at 149°C. For results, see Table 9, Column 4. The oven aging times of the test specimens without added copper stearate, required for comparison, are given in Table 9, Column 3.

Table 9

| Mixture | Additive and Concentrate | Days up to incipient decomposition | |
|---|---|---|---|
| | | without Cu stearate | with Cu stearate |
| 1 | 0.1 part of Additive B<br>0.3 part of Additive D<br>with metal deactivator | 27 | 1 |
| 2 | 0.1 part of Additive B<br>0.3 part of Additive D<br>0.5 part of Stabiliser<br>No. 1 | 25 | 18 |

The designation of the additives is the same as in Example 12.

EXAMPLE 14

100 parts of polypropylene (melt index 3.2 g/10 minutes, 230°C/2160 g) are thoroughly mixed in a shaking apparatus with 0.1 part of 3-(3',5'-ditert.-butyl-4'-hydroxyphenyl)-propionic acid octadecyl ester, 0.3 part of dilaurylthiodipropionate and the indicated amount of one of the additives listed in Table 10 below.

The resulting mixture is kneaded for 10 minutes in a Brabender plastograph at 200°C, 1.0% by weight of powdered copper (manufactured electrolytically, Merck) is then added and the whole is thoroughly mixed at the same temperature for a further 2 minutes. The composition obtained is subsequently pressed in a sheet press at 260°C platen temperature to give 1 mm thick sheets, from which strips 1 cm wide and 17 cm long are punched by means of a punch tool.

The effectiveness of the metal deactivators added to the test strips, as a function of the concentration, is tested by heat aging in a circulating air oven at 149°C. The results are indicated in Table 10.

Table 10

(Days up to incipient decomposition)

| Stabiliser No. | Amount of stabiliser admixed | | |
|---|---|---|---|
| | 0 part | 0.2 part | 0.5 part |
| 1 | <1 | 14 | 20 |
| 6 | <1 | 9 | 14 |
| 13 | <1 | 9 | 18 |
| 18 | <1 | 15 | 22 |
| 29 | <1 | 8 | 15 |

EXAMPLE 15

100 parts of polypropylene (melt index 3.2 g/10 minutes, 230°C/2160 g) are thoroughly mixed for 10 minutes in a shaking apparatus with 0.2 part of one of the additives listed in Table 11 below.

The resulting mixture is kneaded for 10 minutes in a Brabender plastograph at 200°C and the composition thus obtained is subsequently pressed in a sheet press at 260°C platen temperature to give 1 mm thick sheets from which strips 1 cm wide and 17 cm long are punched.

The effectiveness of the additives added to the test strips, in their capacity as antioxidants, is tested by heat aging in a circulating air oven at 135° and 149°C, using an additive-free test strip for comparison. Of each formulation, 3 test strips are employed for this purpose. The incipient, easily visible decomposition of the test strip is defined as the end point; the results are given in days.

Table 11

| Stabiliser No. | Days up to incipient decomposition | |
|---|---|---|
| | 135°C | 149°C |
| without additive | 1 | ½ |
| 3 | 32 | 5 |
| 4 | 41 | 3 |
| 7 | 52 | 4 |
| 8 | 50 | 4 |
| 11 | 43 | 3 |
| 21 | 51 | 5 |
| 22 | 49 | 7 |
| 23 | 46 | 8 |
| 28 | 47 | 4 |
| 30 | 64 | 4 |
| Comparison products | | |
| 33 | 1 | ½ |
| 37 | 1 | ½ |
| 43 | 1 | ½ |
| 44 | 1 | ½ |

EXAMPLE 16

100 parts of polypropylene (melt index 3.2 g/10 minutes, 230°C/2160 g) are thoroughly mixed for 10 minutes in a shaking apparatus with 0.1 part of 3-(3,5-di-t.butyl-4-hydroxyphenyl)-propionic acid octadecyl ester (Additive A) and 0.3 part of dilauryl thiodipropionate (Additive D) and 0.5 part of one of the additives listed in Table 12 below.

The resulting mixture is kneaded for 10 minutes in a Brabender plastograph at 200°C and the composition thus obtained is subsequently pressed in a sheet press at 260°C platen temperature to give 1 cm thick sheets from which strips 1 cm wide and 17 cm long are punched.

The effectiveness of the additives added to the test strips, in their capacity of synergistically acting antioxidants in the presence of the additives A and D, is tested by heat aging in a circulating air oven at 135° and 149°C, using, for comparison, a test strip which only contains the additives A and D. For this purpose, 3 test strips of each formulation are employed. The incipient, easily visible decomposition of the test strip is defined as the end point and the results are given in days.

Table 12

| Stabiliser No. | Days up to incipient decomposition | |
|---|---|---|
| | 135°C | 149°C |
| without additive | 90 | 20 |
| 2 | 93 | 44 |
| 3 | 99 | 45 |
| 4 | 85 | 42 |
| 8 | 176 | 40 |
| 11 | 99 | 45 |
| 21 | 105 | 45 |
| 28 | 99 | 48 |
| 31 | 137 | 50 |
| Comparison products | | |
| 33 | 85 | 18 |
| 37 | 92 | 18 |
| 43 | 90 | 20 |
| 44 | 86 | 19 |

EXAMPLE 17

100 g of unstabilised high pressure polyethylene powder ("Plastylène" of Messrs. Ethylène Plastique, Mazingarbe, France) are thoroughly mixed, dry, with 1.0 g of 1,3-bis-(t-butyl-peroxyisopropylbenzene (Perkadox 14 of Messrs. Oxyde GmbH, Emmerich, Germany) and 0.2 g of one of the additives of Table 13 below. The mixture is worked on a friction mill at 110°C for 10 minutes to give a homogeneous mass. This plastics mixture is pressed in a multi-platen press at 260°C for 20 minutes to give 1 mm thick sheets, and under these conditions crosslinking of the polymer occurs as a result of the added peroxide. Test specimens of size 10 × 140 mm are punched from the sheets thus manufactured by means of a punch tool.

The test specimens are suspended from a V2A steel stirrup and are aged in a circulating air oven at 120°C. After the end of an induction time characteristic of the additive, the degraded material drips off; the results are given in days.

Table 13

| Stabiliser No. | Days up to incipient dripping off, at 120°C |
|---|---|
| without stabiliser | 8 |
| 1 | 24 |
| 18 | 19 |
| 21 | 25 |
| Comparison products | |
| 33 | 8 |
| 44 | 16 |

What we claim is:

1. A stabilized polyolefin containing a polyolefin and 0.01 to 5% of a stabilizer of the formula

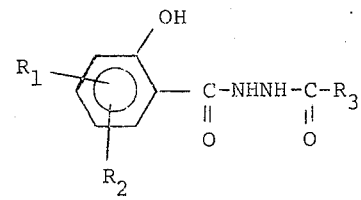

in which $R_1$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_2$ denotes hydrogen, alkyl with 1 to 5 carbon atoms, alkenyl with 3 to 4 carbon atoms cyclohexyl, aralkyl with 7 to 9 carbon atoms, chlorine or hydroxyl, $R_3$ denotes alkyl with 2 to 21 carbon atoms, cyclohexyl or the radical

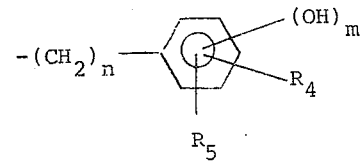

wherein $m$ denotes 0 or 1 and $n$ denotes 0 to 2, the difference $n-m$ being not less than 0 if the OH group is in the o-position to the $-(CH_2)_n$ group, and wherein $R_4$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms, or acylamino with 2 to 18 carbon atoms and $R_5$, if $m$ is 1, denotes hydrogen, alkyl with 1 to 5 carbon atoms, alkenyl with 3 or 4 carbon atoms, cyclohexyl, aralkyl with 7 to 9 carbon atoms, chlorine or hydroxyl, or $R_5$, if $m$ is 0, denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms, or acylamino with 2 to 18 carbon atoms.

2. A stabilized polyolefin according to claim 1, wherein 0.05 to 1.5% of said stabilizer is present.

3. A stabilized polyolefin according to claim 2, wherein 0.1 to 0.8% of said stabilizer is present.

4. A stabilized polyolefin according to claim 1, wherein said polyolefin is polypropylene.

5. A stabilized polyolefin according to claim 1, wherein in said formula of the stabilizer $R_2$ and $R_5$, if $m$ is 1, independently of one another denote hydrogen, alkyl with 1 to 5 carbon atoms, alkenyl with 3 or 4 carbon atoms, cyclohexyl, aralkyl with 7 to 9 carbon atoms or chlorine.

6. A stabilized polyolefin according to claim 1, wherein in said formula of the stabilizer $R_1$ denotes hydrogen, hydroxyl, chlorine, alkyl with 1 to 8 carbon atoms, alkoxy with 1 to 18 carbon atoms or acetoxy, $R_2$ denotes hydrogen, butyl or chlorine and $R_3$ denotes alkyl with 3 to 17 carbon atoms, cyclohexyl or the radical.

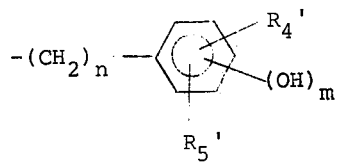

wherein $m$ is 0 or 1, $n$ is 0 to 2 and the difference $n$-$m$ is not less than 0 if the OH group is in the o-position to the —$(CH_2)_n$-group, $R_4'$ is hydrogen, hydroxyl, chlorine, alkyl with 1 to 4 carbon atoms or alkoxy with 1 to 16 carbon atoms and $R_5'$ is hydrogen, chlorine, alkyl with 1 to 4 carbon atoms, hexadecyloxy, acetylamino or o-hydroxybenzoylamino.

7. A stabilized polyolefin according to claim 1, wherein in said formula of the stabilizer $R_1$ denotes hydrogen, alkyl with 1 to 8 carbon atoms, chlorine or alkoxy with 1 to 8 carbon atoms, $R_2$ denotes hydrogen, alkyl with 1 to 5 carbon atoms or chlorine, and $R_3$ denotes alkyl with 3 to 17 carbon atoms, cyclohexyl or one of the radicals

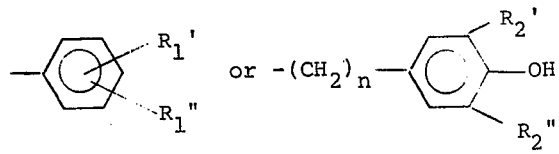

wherein $n$ denotes 0 to 2, $R_1'$ and $R_1''$ independently of one another denote hydrogen, alkyl with 1 to 8 carbon atoms, chlorine or alkoxy with 1 to 8 carbon atoms and $R_2'$ and $R_2''$ independently or one another denote hydrogen, alkyl with 1 to 5 carbon atoms or chlorine.

8. A stabilized polyolefin according to claim 1, wherein in said formula of the stabilizer $R_1$ denotes hydrogen, alkyl with 1 to 5 carbon atoms or alkoxy with 1 to 18 carbon atoms, $R_2$ denotes hydrogen or alkyl with 1 to 5 carbon atoms and $R_3$ denotes alkyl with 3 to 17 carbon atoms or one of the radicals

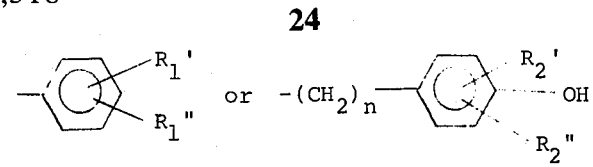

wherein $n$ denotes 0 to 2, $R_1'$ and $R_1''$ independently of one another denote hydrogen, alkyl with 1 to 5 carbon atoms or alkoxy with 1 to 18 carbon atoms and $R_2'$ and $R_2''$ independently of one another denote hydrogen or alkyl with 1 to 5 carbon atoms.

9. A stabilized polyolefin according to claim 1, wherein said stabilizer is of the formula

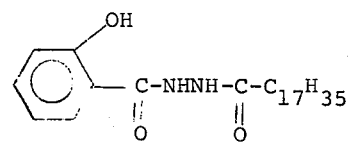

10. A stabilized polyolefin according to claim 1, wherein said stabilizer is of the formula

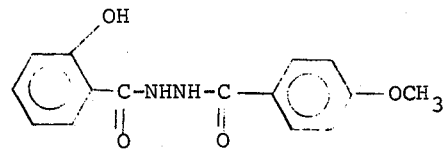

11. A stabilized polyolefin according to claim 1, wherein said stabilizer is of the formula

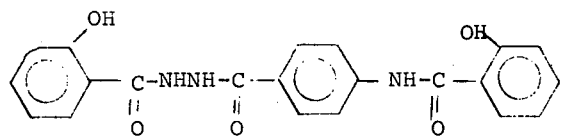

12. A stabilized polyolefin according to claim 1, wherein said stabilizer is of the formula

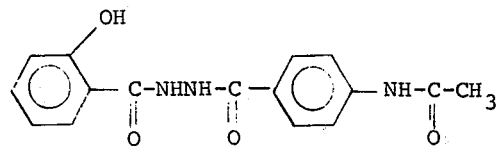

13. A stabilized polyolefin according to claim 1, wherein said stabilizer is of the formula.

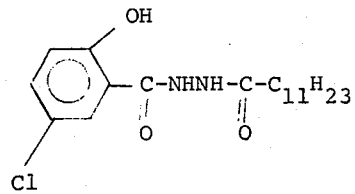

* * * * *